US 6,736,614 B1
(12) United States Patent
Bahnen et al.

(10) Patent No.: US 6,736,614 B1
(45) Date of Patent: May 18, 2004

(54) ROTARY PISTON DRIVE MECHANISM

(75) Inventors: Rudolf Bahnen, Roetgen (DE); Josef Hodapp, Köln-Sülz (DE); Gunter Knoll, Aachen (DE)

(73) Assignee: Leybold Vakuum GmbH, Cologne (DE)

( * ) Notice: Subject to any disclaimer, the term of this patent is extended or adjusted under 35 U.S.C. 154(b) by 0 days.

(21) Appl. No.: 09/959,218

(22) PCT Filed: Apr. 19, 2000

(86) PCT No.: PCT/EP00/03528
§ 371 (c)(1),
(2), (4) Date: Feb. 4, 2002

(87) PCT Pub. No.: WO00/63556
PCT Pub. Date: Oct. 26, 2000

(30) Foreign Application Priority Data

Apr. 19, 1999 (DE) .......................... 199 17 560
Apr. 18, 2000 (DE) .......................... 100 19 108

(51) Int. Cl.⁷ .................................................. F04B 17/04
(52) U.S. Cl. ...................................... 417/417; 417/418
(58) Field of Search ................................ 417/417, 418

(56) References Cited

U.S. PATENT DOCUMENTS

| 3,422,765 A | 1/1969 | Schloch ..................... 103/53 |
| 3,606,595 A | 9/1971 | Takamizawa et al. ....... 417/417 |
| 3,884,125 A | 5/1975 | Massie ...................... 92/13.5 |
| 4,353,220 A | 10/1982 | Curwen et al. .............. 62/228 |
| 4,638,193 A | 1/1987 | Jones ........................ 310/15 |
| 4,726,741 A | 2/1988 | Cusack ...................... 417/322 |
| 4,843,951 A | * 7/1989 | Bruggen et al. ............. 92/5 R |
| 4,883,467 A | * 11/1989 | Franetzki et al. ........... 604/152 |
| 5,395,218 A | 3/1995 | Thompson ................. 417/416 |
| 5,818,131 A | 10/1998 | Zhang ........................ 310/15 |
| 5,833,440 A | * 11/1998 | Berling ...................... 417/418 |

FOREIGN PATENT DOCUMENTS

| DE | 41 02 710 | 8/1991 |
| DE | 195 04 751 | 8/1996 |
| GB | 2052886 | 1/1981 |
| GB | 2241287 | 8/1991 |
| WO | WO 98/09080 | 3/1998 |

* cited by examiner

Primary Examiner—Justine R. Yu
Assistant Examiner—William H. Rodriguez
(74) Attorney, Agent, or Firm—Fay, Sharpe, Fagan, Minnich & McKee, LLP

(57) ABSTRACT

A reciprocating piston drive mechanism, especially for a reciprocating piston vacuum pump, includes a cylinder (3) embodied in a housing (12). A piston (4) is moved back and forth in the cylinder by an electromagnetic drive that has an electromagnet (11) on the stator side and at least one permanent magnet (18, 19) on the piston side. In order to increase service life of said drive mechanism, permanent magnets (15, 16) are also provided on the stator side. The piston permanent magnet(s) (18, 19) and the stator permanent magnets (15, 16) are configured and disposed in such a way that the piston (4) is magnetically biased to a substantially central axial position in the idle state.

27 Claims, 4 Drawing Sheets

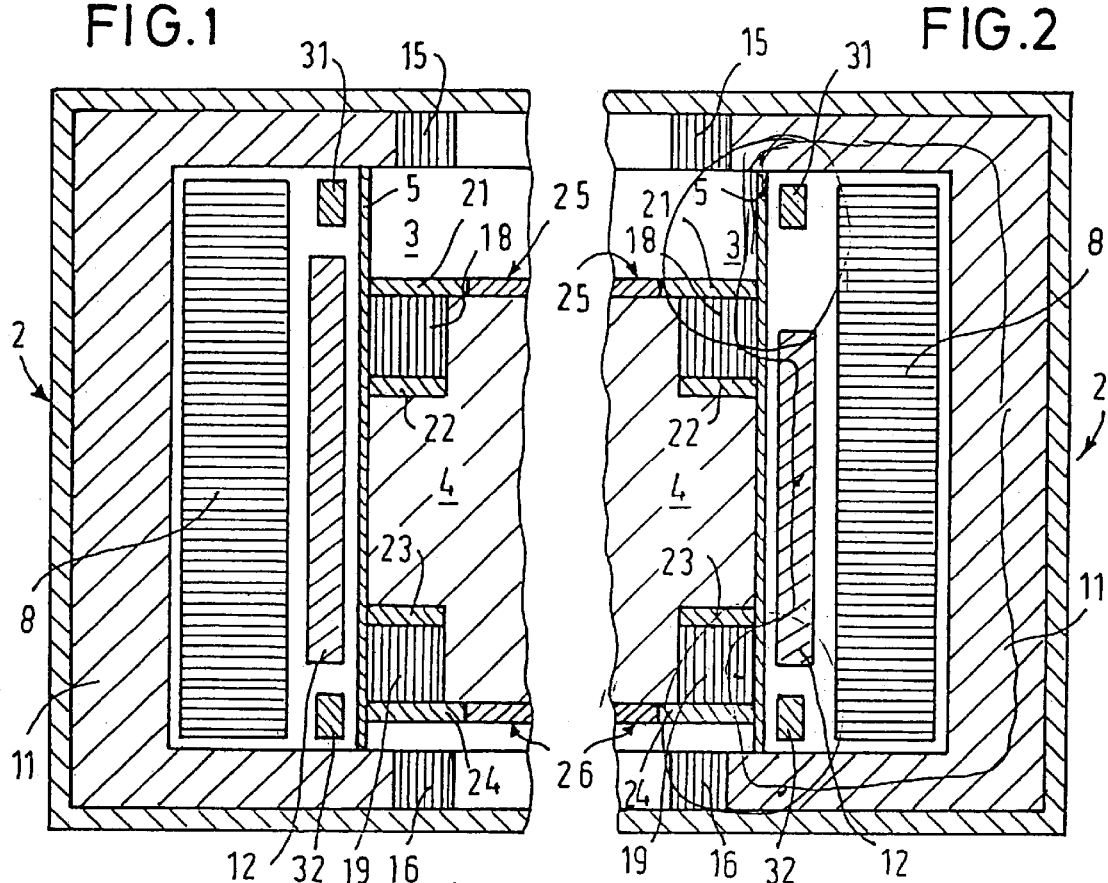
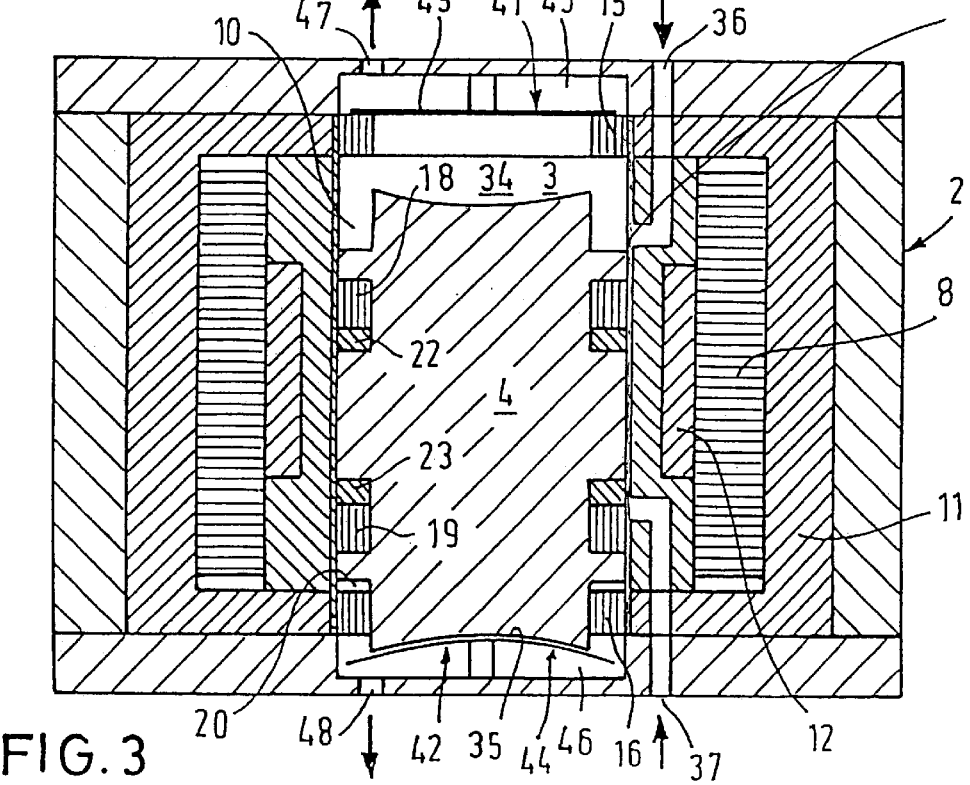

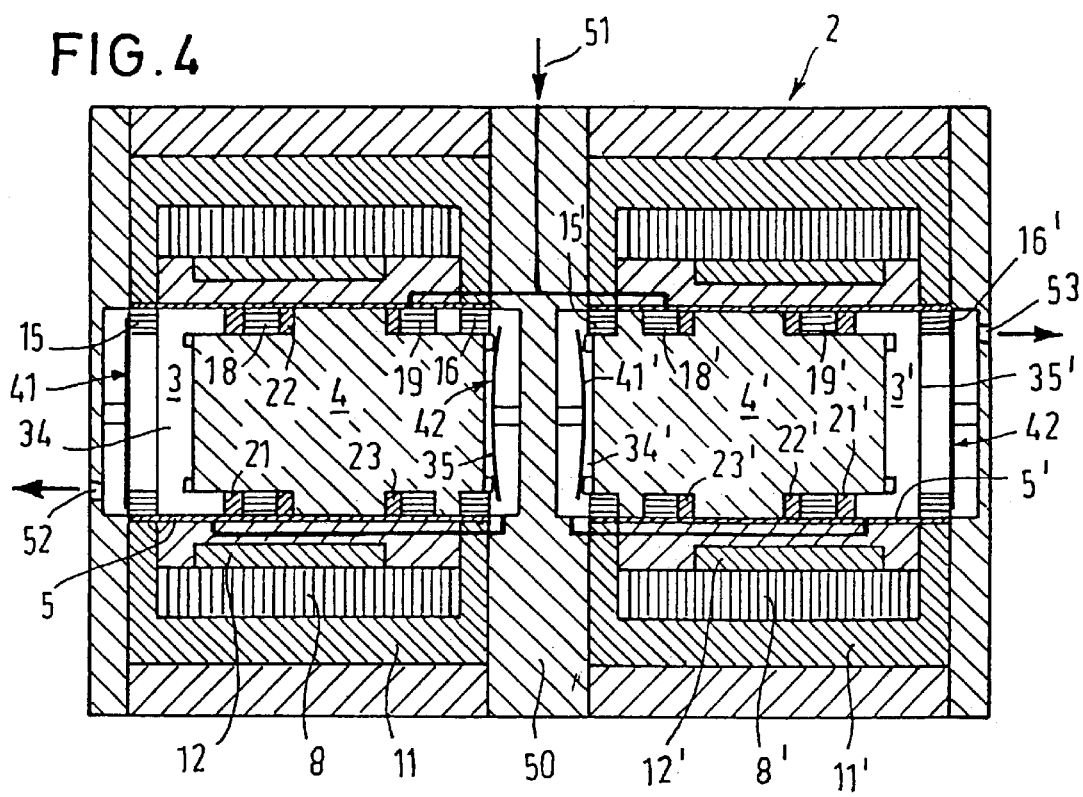
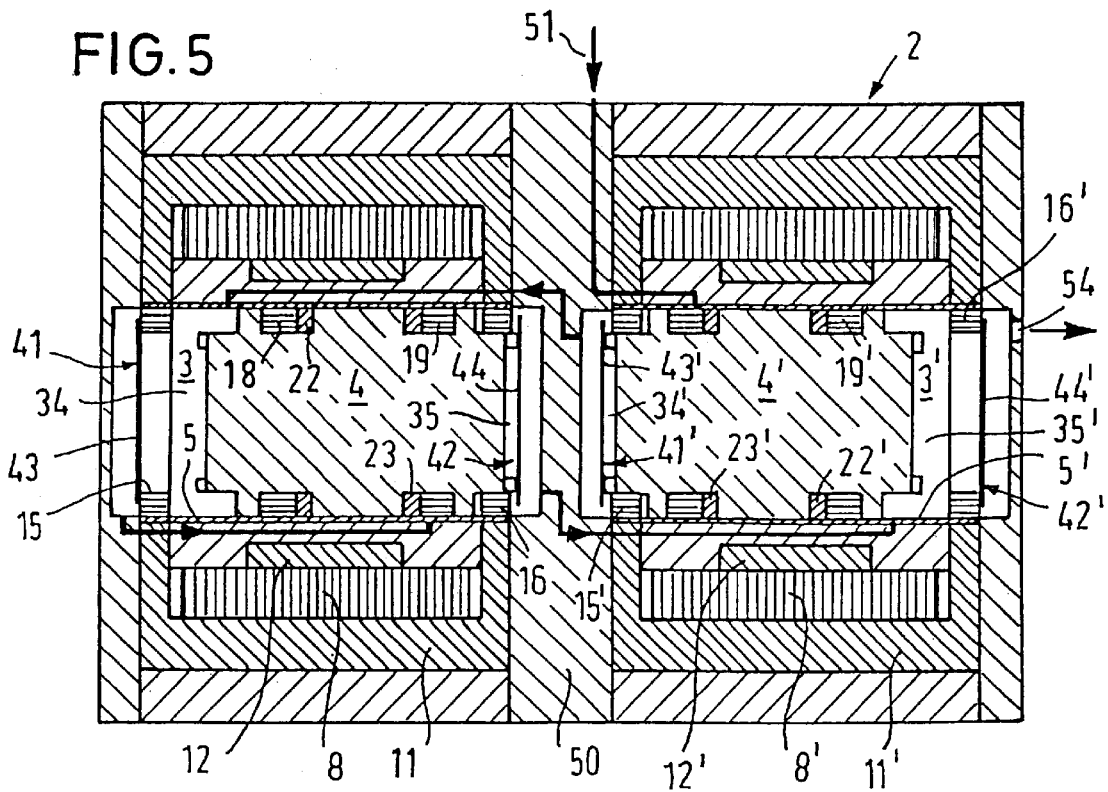

ROTARY PISTON DRIVE MECHANISM

BACKGROUND OF THE INVENTION

The present invention relates to a reciprocating piston drive mechanism, especially for a reciprocating piston vacuum pump, comprising a housing, a cylinder embodied in said housing, a piston moving back and forth in the cylinder and an electromagnetic drive for the piston that has an electromagnet on the stator side and at least one permanent magnet on the piston side.

A reciprocating piston drive mechanism having such characteristics is known from GB 2,241,287. In this reciprocating piston drive mechanism according to the state-of-the-art there are located in the cylinder two springs, of which one each extends between one of the face sides of the piston and the related face side of the cylinder. Through this, the piston adopts a substantially central axial position in the idle state. When continually stressing the helical springs, fatigue affecting the material of the springs is unavoidable. For this reason, the service life of reciprocating piston drive mechanisms according to the state-of-the-art is thus limited to the service life of the material employed for the springs.

The reciprocating piston drive mechanism according to GB 2,241,287 is a component of a reciprocating piston pump, in which at least one of the two chambers created by piston and cylinder has the function of a compression chamber. Located in this chamber or these chambers are the helical springs. This give rise to unwanted clearance volumes, this impairing the pumping effect.

SUMMARY OF THE INVENTION

It is the task of the present invention to improve a reciprocating piston drive mechanism of the aforementioned kind in such a manner that it no longer offers the disadvantage of spring materials being subjected to fatigue. Moreover, the design goal is such that the drive mechanism be particularly well suited for reciprocating piston vacuum pumps.

This task is solved by the present invention in that permanent magnets are provided on the stator side and where the stator magnet(s) is/are so configured and disposed that the piston adopts a substantially central axial position in the idle state. In the idle state, i.e. with the electromagnets de-energised, the superimposed magnetic fields being generated by the permanent magnets affixed to the piston and in the stator, generate forces affecting the piston holding it in a central axial position. Thus in the idle state a defined, for example, central piston position results which is solely effected by the effect of magnetic forces and does not require any additional facility of a mechanical kind, like springs.

It is expedient that the piston be equipped with two permanent magnets, of which one each is located in the area of the two face sides of the piston. Assigned to each of these permanent magnets on the side of the piston is one each permanent magnet on the stator side, specifically in the area of the face sides of the cylinder at an approximately equal radial position. In a particularly simple solution, the piston is only equipped with a permanent magnet ring arranged approximately centrally in the axial direction. Located to the side of this ring, there is located one each permanent magnet on the stator side, the distances of which with respect to the magnet ring of the piston define the amplitude of the piston's stroke and the desired amount of piston delay as soon as it approaches one of the dead centers.

If the permanent magnets of the stator are magnetised in the axial direction with reversed polarity with respect to the corresponding permanent magnets of the piston, then their magnetic fields will generate repelling forces. These forces then have the effect that the velocity of the piston, as it approaches the face side of the cylinder, is reduced, and finally the movement of the piston in the reverse direction is initiated. If this arrangement is designed to be in all symmetrical, specifically with respect to its dimensions and also with respect to the strength of the magnetic fields, then the piston will, in the de-energised state of the electromagnet's coil, assume a central axial position.

When employing the drive mechanism in accordance with the present invention in a reciprocating piston vacuum pump, an asymmetrical arrangement in the axial direction may be expedient, since the symmetry conditions determine the force characteristic. If the load on the two compression chambers of the pump located at the two face sides is asymmetric during the pumping process, the force characteristic can be adapted by an axially asymmetric drive mechanism.

Further advantages and details of the present invention shall be explained with reference to the schematically depicted design examples of drawing FIGS. 1 to 8.

BRIEF DESCRIPTION OF THE DRAWING

Depicted are in drawing FIGS. 1 and 2 sectional views through two implementations of a reciprocating piston drive mechanism according to the present invention, drawing FIG. 3 a reciprocating piston vacuum pump with a drive mechanism according to the present invention, drawing FIGS. 4 and 5 design implementations for reciprocating piston vacuum pumps each with two pistons, drawing FIGS. 6 and 7 examples of circuits and drawing FIG. 8 a further implementation example for a reciprocating piston vacuum pump according to the present invention.

DETAILED DESCRIPTION OF THE PREFERRED EMBODIMENT

Figure 6:
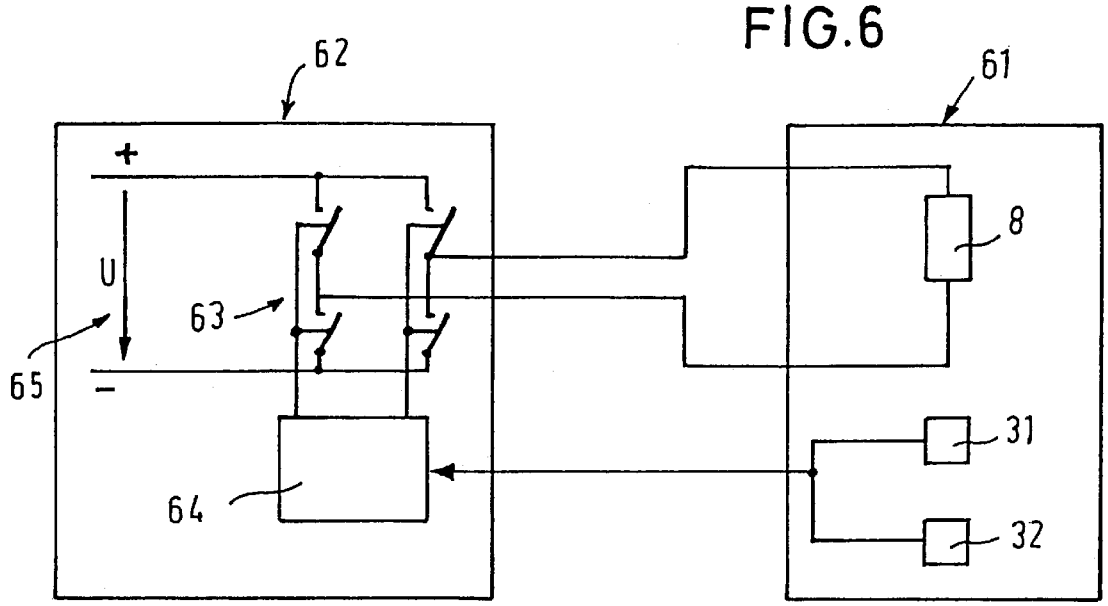

In the drawing figures in each case the outer housing is designated as 2, the cylinder embodied in the housing 2 as 3, the piston located in cylinder 3 as 4 and its sleeve as 5.

The stator components of the electromagnetic drive mechanism accommodated in the housing in accordance with drawing FIGS. 1 to 5, are at least one coil 8 as well as a pole component 11 (yoke) with a U-shaped cross section open towards the inside encompassing the coil(s) 8 from three sides. Moreover, a pole component 12 (guiding yoke) shaped like a pipe section is provided which is located between coil 8 and sleeve 5. Finally, two permanent magnets 15, 16 which are located in the areas of the face sides of cylinder 3 belong to the stator system. The U-limbs of the yoke 11 terminate at the level of these permanent magnets 15, 16.

Two permanent magnets 18, 19 which are located in the areas of the face sides of the piston 4 are components of the electromagnetic drive mechanism on the side of the piston. In the radial direction, pole components, particularly covering disks 21 to 24 (drawing FIGS. 1,2), are assigned to the permanent magnets 18, 19. Expediently, they are covered by these pole components, whereby the covering disks 21, 24 located on the face side may be components of piston covering disks 25, 26 which in their central areas consist of non-ferromagnetic material. The remaining part of the piston 4 is made of non-ferromagnetic material.

The design of the drive mechanisms depicted in drawing FIGS. 1 to 5 is preferably rotationally symmetrical. Expedient here is the configuration of ring-shaped permanent magnets, both at the stator (15, 16) and also at the piston (18,19). Non-rotationally symmetrical solutions would be more involved as to their manufacture.

In all design examples depicted in drawing FIGS. 1 to 5 in each instance two permanent magnets 18, 19 are provided at the piston substantially at the face side. These might also be replaced by a single piece permanent magnet which, for example, when shaped like a tube encompasses the piston 4.

Expediently reciprocating piston drive mechanisms according to all drawing figures are equipped with sensor components; only in drawing FIGS. 1 and 2 are such sensor components 31, 32 depicted. They are also configured to be ring-shaped. One is arranged in the area of the two face sides of the electromagnetic drive mechanism. These sensors 31, 32 serve to detect the piston's position, chiefly in the area of its dead centers. Preferably the sensors 31, 32 are designed as ring-shaped coils. The voltage induced in these ring-shaped coils depends on the position of the piston, so that the generated signals can be employed to drive the coil(s) 8. Instead of the ring-shaped coils also Hall elements, optical sensors or eddy current sensors may be utilised.

The reciprocating piston drive mechanisms in accordance with drawing FIGS. 1 and 2 differ only with respect to the way in which the guiding yoke 12 is designed. In the design example in accordance with drawing FIG. 1 it is designed to be symmetrical in the axial direction. The driving forces exerted on the piston 4 are for this reason also symmetrical. In the design example in accordance with drawing FIG. 2 the guiding yoke 12 is asymmetrical in the axial direction. Its distance to sensor coil 32 is less than its distance to sensor coil 31. For this reason, the driving forces exerted in the area of the sensor coil 32 on the permanent magnet 19 of the piston 4 are greater than the corresponding driving forces in the area of permanent magnet 18. This effect may also be attained by an axially unsymmetrical design of other pole components, for example, the covering disks 21 to 24, the design of the limb ends of yoke 11 or alike. Moreover, the reciprocating piston drive mechanisms in accordance with drawing FIGS. 1 and 2 are depicted in a highly schematic manner. Drive components linked to the piston 4 have been omitted.

Drawing FIG. 3 depicts a reciprocating piston vacuum pump equipped with a reciprocating piston drive mechanism according to the present invention. In this example of an implementation the cylinder 3, the face sides of the piston 4 and the sleeve 5 form partial volumes 34, 35, having the function of compression chambers. Each of these pump stages has each an inlet 36, 37 which at the side opens out into the compression chamber 34 and 35 respectively. Thus the piston and the openings have, in a basically known manner, the function of inlet control valves. The discharge valves 41, 42 are each arranged on the face side. Preferably the discharge opening substantially extends over the entire cross sectional area of the cylinder 3 (basically known from DE-A-196 34 517). The closure components are designed as flexible discs 43, 44 extending across the entire cross section of cylinder 3, said discs being centrally affixed at housing 2 and being actuated peripherally by the pressure created or by the face sides of the piston. In the example of a design implementation in accordance with drawing FIG. 3, the face sides of the piston have a concave contour. The face sides of the cylinder wall or—as depicted in drawing FIG. 3—the outer face sides of the permanent magnets 15, 16 on the stator side form the valve seats. The gases emerging from the valves 41, 42 first enter into the discharging chambers 45, 46 to which outlets 47, 48 are linked.

In the implementation in accordance with drawing FIG. 3, the stator permanent magnets 15, 16 are located in cylinder 3. The face sides of the pistons are equipped with outer recesses 10, 20 corresponding to the size of these magnets. These measures serve the purpose of avoiding clearance volumes while the pump is operating.

Depicted in drawing FIGS. 4 and 5 are examples of implementations for reciprocating piston vacuum pumps where in a housing 2 having a joint center housing plate 50, two each pistons 4, 4' of the same design are accommodated. The drive mechanisms are so designed and controlled that the two pistons 4, 4' reciprocate in opposing directions. Owing to the thus effected balancing of masses, the pumps are free of vibrations. In the example of the implementation depicted in drawing FIG. 4, the two pumping stages of the two pistons 4 and 4' are connected in parallel. From the paths for the gases, in each case schematically represented by lines, it is apparent that the gas which is to be pumped is fed from the gas inlet 51 to the compression chambers 35 and 34'. They exit these compression chambers through discharge valves 42, 41'. From there they are in each instance supplied to the compression chambers 34 and 35' respectively. The two gas outlets are designated as 52 and 53.

The depicted discharge valves 41, 42 and 41', 42' are similarly designed as depicted for the design example in accordance with drawing FIG. 3. The difference is, that the face sides of the pistons 4, 4' do not exhibit a concave contour; instead they are equipped with tappets which actuate the related valves discs. Other embodiments for discharge valves of this kind are known from DE-A-196 34 517.

Moreover, also different compared to the solution in accordance with drawing FIG. 3 is that both drive mechanisms for the pistons 4 and 4' are in each instance designed to be asymmetrical in the axial direction. The yoke components 12, 12' are extended towards the respective gas discharge side (outlets 52, 53). The permanent magnets on the outlet side 18 and 19' of the pistons 4 and 4' are covered on both sides by the pole components 21, 22 and 21', 22' respectively whereas to the inner permanent magnets 19, 18' in each instance only one pole component 23 and 23' respectively is assigned. Through these measures the force characteristics of the drive mechanisms take account of the fact that the outer pumping stages are pumping against atmospheric pressure.

In the example of the design implementation in accordance with drawing FIG. 5 the four pumping stages are series connected. The gases pumped from the inlet 51 to the outlet 54 pass through compression chambers 34', 34, 35, 35' one after the other. The solution in accordance with drawing FIG. 5 is particular, in that the closure motion of the valves 41, 42, 41', 42' is effected magnetically. The disc-shaped closure elements consist at least in part (outer wall, for example) of ferromagnetic material, so that the permanent magnets 15, 16, 15' 16' of the stator exercise an attracting force. The discs are opened under pressure control or under piston control (via the tappets depicted), whereas the closure motion is effected by magnetic forces.

Figure 7:
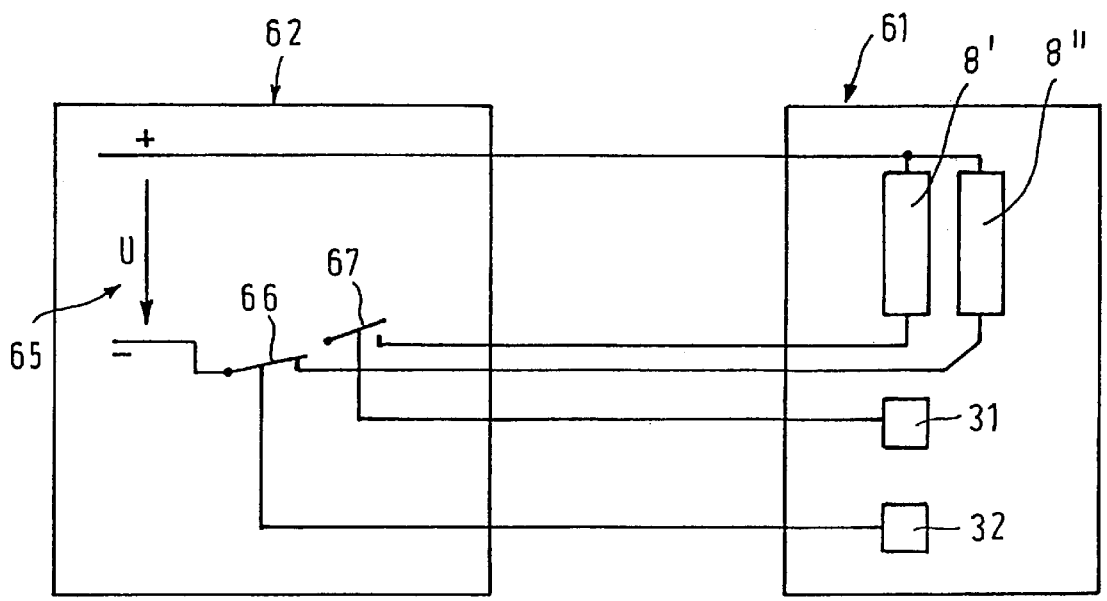

Depicted in drawing FIGS. 6 and 7 are examples of circuits for reciprocating piston drive mechanisms equipped with sensor components. The components of the drive mechanism are in each instance accommodated in block 61, and the components of the electronics in block 62.

Drawing FIG. 6 depicts a solution having only one coil 8, which is driven depending on the signals from the sensors 31, 32. A bridge circuit 63 comprising four switches is employed for driving purposes, where on the one hand the supply voltage U and on the other hand the signals from the sensors 31, 32 processed by logic circuitry 64 are supplied to said bridge. The four electronic power switches are driven by the logic circuitry 64 in such a manner that the two terminals of coil 8 are connected, depending on the desired direction for the current flow, to the positive or the negative terminal of the DC source 65.

In the arrangement in accordance with drawing FIG. 7, two coils 8' and 8" wound in opposing directions are located in the chamber accommodating the coils of the drive mechanism. They may be arranged next to each other or concentrically with respect to each other. In this case the current will need to flow only in one direction through the two coils. For this reason one end of the coil is permanently connected to the positive terminal of the DC supply voltage U, whereas the other ends of the coil are connected through two electronic power switches 66, 67 to the negative terminal of the DC voltage U in alternating fashion. The two switches are driven directly through the sensors 31, 32 at the top and bottom dead center. This embodiment minimises the complexity of the power electronic circuitry. However, it implies an inadequate utilisation of the chamber accommodating the coils.

There exists the possibility of dispensing with sensor components in the drive mechanism. In this instance the voltage induced in the coil(s) in the stator may be utilised as information for sensing the piston's position, and the subsequent current flow through the same coil(s) may be derived therefrom.

As to the way in which the coil(s) is/are driven, several embodiments are suited for implementation. In the first, an oscillatory frequency is defined at a fixed frequency and the current in the coil(s) is pre-set in such a manner that this frequency is also attained. The motion is reversed at the end position in each case. This approach is termed as "external control". This principle offers the disadvantage that at very high process loads the pump is prone to being overloaded.

In a second control law, the principle of "self-control" is utilised. In this case the maximum current through the coil(s) is pre-set, and in the event of too high a load the oscillatory frequency is reduced. Here too, the motion is reversed as soon as the piston reaches its end position in each case.

In a third control law, the second control law is varied inasmuch as the motion is reversed already before the piston attains its end position. Thus the reciprocating piston motor can be protected during "pump up" or in the event of continuous and excessively high loads, against being overloaded. In addition, the system may be rated for smaller forces and its implementation can be made to be more cost-effective. The same equally also applies to the second control law.

Figure 8:
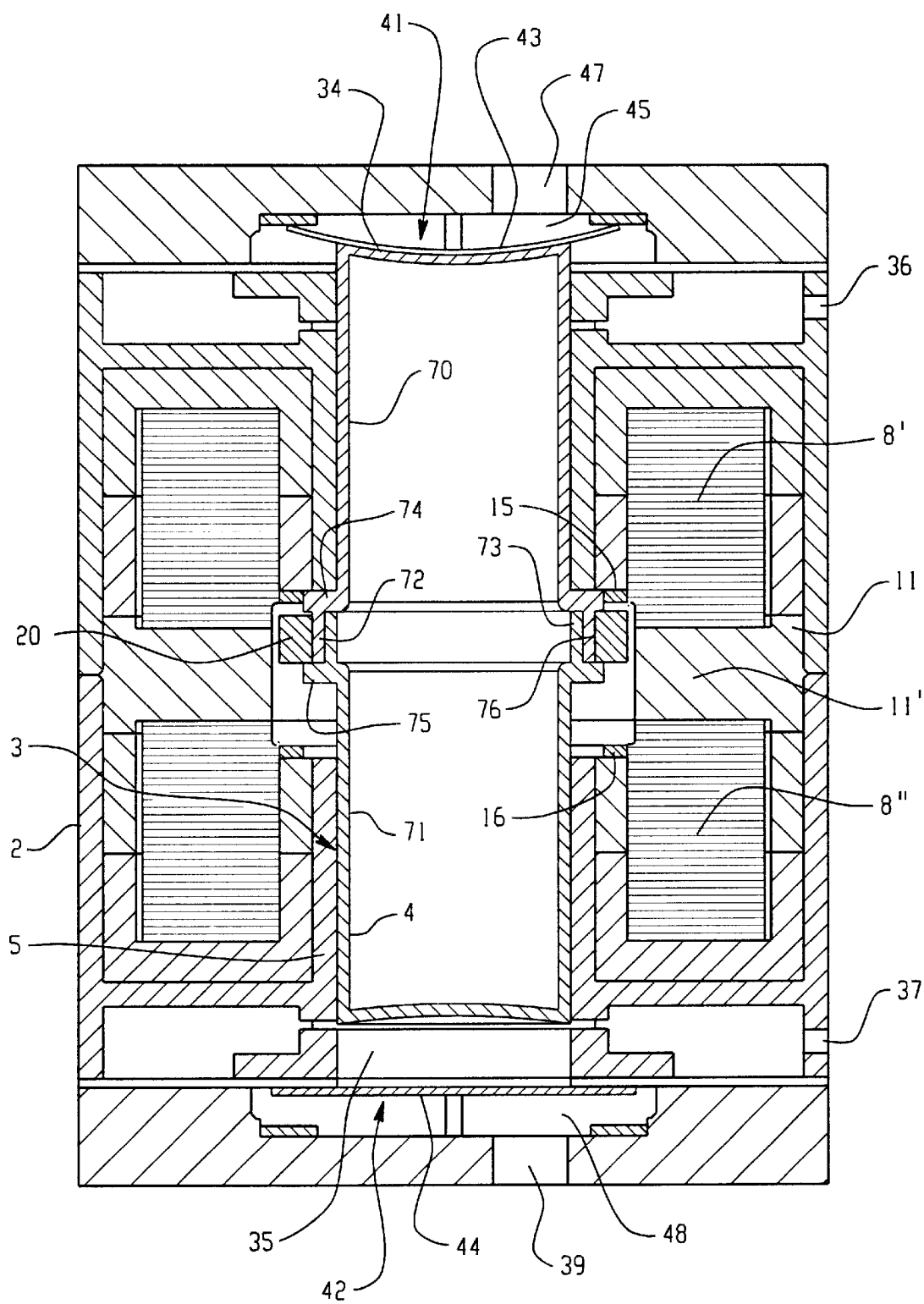

The example of the implementation of a reciprocating piston vacuum pump in line with the present invention in accordance with drawing FIG. 8 differs from the implementation in accordance with drawing FIG. 3, in that the piston 4 is only equipped with a permanent magnet ring 20 arranged centrally in the axial direction. It encompasses the jacket of the piston 4 so that the two permanent magnets 15, 16 on the stator side can be spaced at the side at a distance which corresponds to the amplitude of the piston. The section of the linear drive mechanism on the stator side is adapted to the arrangement of the permanent magnets 15, 16, 20. Two coils 8', 8" are provided being encompassed by a yoke 11 with a central yoke component 11'.

The face side of the central yoke component 11' oriented radially towards the inside encompasses the permanent magnet ring 20. The face sides of the inner, axially extending yoke components rest flush from the outside against the permanent magnets 15, 16 on the stator side.

Moreover, from drawing FIG. 8 an expedient embodiment for piston 4 is apparent. For example, it consists of two pot components 70, 71 which within the area of their open sides are joined together by gluing, for example. For this purpose one each axially directed protrusion 72 and 73 respectively which, in the joined state meet concentrically against each together, may be employed. Moreover, the pot components 70, 71 are equipped in the area of their open sides each with a radially extending rim 74 and 75 respectively. The distance of these rims 74, 75 from the corresponding open face side of the pot components 70, 71 is so selected that these form, when joined, a circular groove 76, the width of which corresponds to the width of the permanent magnet ring 20. With this solution more reliable affixing of the ring 20 on the piston 4, as well as a piston mass which is as low as possible, can be achieved.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A reciprocating piston drive mechanism for a reciprocating piston vacuum pump, comprising:
    a housing,
    a cylinder defined in said housing,
    stator permanent magnets disposed in the cylinder,
    a piston mounted for back and forth movement in the cylinder, face sides of the piston being equipped with recesses, which correspond to the dimensions of the stator permanent magnets,
    an electromagnetic drive for the piston including an electromagnet on a stator side and at least one permanent magnet on the piston,
    the stator permanent magnets being disposed relative to the permanent magnet of the piston in such a way that the piston adopts a substantially centered axial position in an idle state.

2. The drive mechanism according to claim 1, wherein:
    the piston is equipped on each of its face sides with the piston permanent magnet; and
    the stator permanent magnets are located in the area of face sides of the cylinder.

3. The drive mechanism according to claim 1, wherein the stator includes axially symmetrical pole components.

4. A reciprocating piston for a reciprocating piston vacuum pump, comprising:
    a housing,
    a cylinder defined in said housing,
    a piston mounted for back and forth movement in the cylinder,
    an electromagnetic drive for the piston including an electromagnet on a stator side and at least one permanent magnet on the piston,
    stator permanent magnets disposed on the stator side and disposed relative to the permanent magnet of the piston in such a way that the piston adopts a substantially centered axial position in an idle state, a pole component with a cross section having a U-shape and U-limbs which end at a level of the permanent magnets on the stator side.

5. The drive mechanism according to claim 4, wherein the U-shaped pole component encompasses at least one coil from three sides.

6. The drive mechanism according to claim 5, wherein a further cylindrical pole component is located between the coil and the cylinder.

7. The drive mechanism according to claim 4, wherein axially arranged pole components are assigned to the permanent magnets at the piston.

8. A reciprocating piston drive mechanism for a reciprocating piston vacuum pump, comprising:
   a housing,
   a piston mounted for back and forth movement in a cylinder, the piston being equipped only with a single permanent magnet situated approximately centrally in an axial direction,
   an electromagnet on a stator which interacts with the permanent magnet on the piston to drive the piston,
   stator permanent magnets disposed on the stator and disposed relative to the permanent magnet of the piston in such a way that the piston is biased toward a substantially centered axial position in an idle state.

9. The drive mechanism according to claim 8, wherein permanent magnets on the stator are located on opposite sides of the permanent magnet of the piston, a distance between the permanent magnets on the stator corresponds to an amplitude of the piston's motion.

10. The drive mechanism according to claim 8, wherein:
    two coils are provided next to each other along the axial direction,
    a yoke encompasses the coils,
    a face side of a central yoke component encompasses the permanent magnet of the piston, and
    face sides of inner axially extending yoke components rest against the permanent magnets on the stator.

11. A reciprocating piston drive mechanism for a reciprocating piston vacuum pump, comprising:
    a housing,
    a cylinder defined in said housing,
    a piston mounted for back and forth movement in the cylinder,
    a rotationally symmetrical electromagnetic drive for the piston including an electromagnet on a stator and at least one ring-shaped permanent magnet on the piston,
    stator permanent magnets disposed on the stator and disposed relative to the ring-shaped permanent magnet of the piston in such a way that the piston is biased to a preselected axial position in an idle state.

12. A reciprocating piston drive mechanism for a reciprocating piston vacuum pump, comprising:
    a housing in which a cylinder is defined,
    a stator surrounding the cylinder,
    a piston mounted for back and forth movement in the cylinder,
    an electromagnetic drive for the piston including an electromagnet, permanent magnets, and pole components in the stator and at least one permanent magnet on the piston, at least one of the pole components interacting with the stator magnets such that resultant magnetic forces are axially asymmetrical,
    the stator permanent magnets being disposed relative to the piston permanent magnet to bias the piston toward a substantially centered axial position in an idle state.

13. A method for operating a drive mechanism according to claim 12, wherein at least one of a frequency of the piston's motion and a maximum current flow in the electromagnet is pre-set.

14. The method according to claim 13 wherein the piston motion is reversed before reaching an end of travel.

15. A reciprocating piston drive mechanism for a reciprocating piston vacuum pump, comprising:
    a housing,
    a cylinder defined in said housing,
    a piston mounted for back and forth movement in the cylinder,
    an electromagnetic drive for the piston including an electromagnet on a stator and at least one permanent magnet on the piston,
    sensors for detecting the piston's position,
    stator permanent magnets disposed on the stator relative to the piston permanent magnet to urge the piston to adopt a substantially centered axial position in an idle state.

16. A reciprocating piston vacuum pump comprising:
    a housing,
    a cylinder defined in said housing,
    a piston mounted in the cylinder for back and forth movement, the piston and the cylinder defining two chambers, at least one of two chambers created by the piston and the cylinder being equipped with an inlet valve and a discharge valve,
    an electromagnetic drive for the piston including a stator electromagnet and at least one piston permanent magnet,
    stator permanent magnets disposed relative to the piston permanent magnet for biasing the piston to a substantially center axial position.

17. A piston for a reciprocating piston pump according to claim 16, the piston including: two pot components which in an area of their open face sides are equipped with joining means.

18. The piston according to claim 17, wherein the pot components are equipped in the area of their open face sides with rims which in the assembled state form a ring groove for accepting a single permanent magnet ring.

19. A reciprocating piston vacuum pump comprising:
    a housing;
    a cylinder defined in the housing;
    a piston mounted in the cylinder, the piston and cylinder defining a pair of chambers on opposite sides of the piston, the piston mounted for reciprocating movement in the cylinder, which reciprocating movement expands one of the chambers as it contracts the other;
    an inlet line opening into at least one of the chambers, the opening of said inlet line forming together with the piston an inlet valve,
    at least one permanent magnet mounted on the piston;
    permanent magnets mounted on a stator such that magnetic forces between the stator permanent magnets and the piston permanent magnet urge the piston toward a substantially central axial position; and,
    an electromagnet on the stator for selectively urging the permanent magnet on the piston to move the piston along the cylinder.

20. A reciprocating piston vacuum pump comprising:
    a housing;
    a cylinder defined in the housing;

a piston mounted in the cylinder, the piston and cylinder defining a pair of chambers on opposite sides of the piston, the piston mounted for reciprocating movement in the cylinder, which reciprocating movement expands one of the chambers as it contracts the other;

discharge valves which are controlled by one of pressure and the piston, at least one permanent magnet mounted to a piston;

permanent magnets mounted on a stator such that magnetic forces between the stator permanent magnets and the piston permanent magnet bias the piston toward a substantially centered position axially; and, an electromagnet on the stator for selectively urging the permanent magnet on the piston to reciprocate the piston in the cylinder.

21. The pump according to claim 20 wherein the discharge valves include closure pieces which extend substantially over the entire cross section of the cylinder.

22. The pump according to claim 21, wherein closing motion of the closure pieces is assisted by the resilient forces of springs.

23. The pump according to claim 21, wherein closing motion of the closure pieces is assisted by the magnetic forces.

24. The pump according to claim 23, wherein:

the closure pieces include discs made at least partly of a ferromagnetic material; and an outer face side of one of the permanent magnets on the stator forms a discharge valve seat.

25. A reciprocating piston vacuum pump comprising:

a housing;

several cylinders accommodated in the housing, a piston mounted in each of the cylinders, the pistons and cylinders defining pairs of chambers on opposite sides of each piston, each piston being mounted for reciprocating movement in a corresponding one of the cylinders, which reciprocating movement expands one of the chambers as it contracts the other;

at least one permanent magnet mounted on each piston;

permanent magnets mounted on a stator such that magnetic forces between the stator permanent magnets and the piston permanent magnets urge the pistons toward selected axial positions; and, an electromagnet on the stator for selectively reciprocating each piston along the corresponding cylinder.

26. A method for operating a pump according to claim 25, wherein pairs of the pistons are controlled to reciprocate in opposite directions.

27. A reciprocating piston vacuum pump comprising:

a housing;

a cylinder defined in the housing;

a piston mounted in the cylinder, the piston and cylinder defining a pair of chambers on opposite sides of the piston, the piston mounted for reciprocating movement in the cylinder, which reciprocating movement expands one of the chambers as it contracts the other;

at least one permanent magnet mounted on the piston;

permanent magnets mounted on a stator such that magnetic forces between the stator permanent magnets and the piston permanent magnet bias the piston;

an electromagnet on the stator for selectively urging the permanent magnet on the piston to move the piston along the cylinder; and, a switching means for driving the electromagnet, said switching means being driven by signals dependent on the piston's position.

* * * * *